United States Patent [19]

Brady

[11] Patent Number: 4,912,871
[45] Date of Patent: Apr. 3, 1990

[54] CRAB LURE

[76] Inventor: Todd M. Brady, 305 E. 88th St., Lafourche, Galliano, La. 70354

[21] Appl. No.: 294,009

[22] Filed: Jan. 6, 1989

[51] Int. Cl.$^4$ .............................................. A01K 85/00
[52] U.S. Cl. ................... 43/42.26; 43/42.32; 43/42.33; 43/42.38; 43/42.4
[58] Field of Search .................. 43/42, 42.1, 42.24, 43/42.26, 42.32, 42.33, 42.37, 42.38, 42.4, 42.41, 42.43, 42.45, 42.53

[56] References Cited

U.S. PATENT DOCUMENTS

| | | | |
|---|---|---|---|
| 2,054,454 | 9/1936 | Thies et al. | 43/42.32 |
| 2,277,790 | 3/1942 | Sisco | 43/42.37 |
| 2,303,097 | 11/1942 | Townsend et al. | 43/44 |
| 2,341,999 | 2/1944 | Lennington | 43/42.26 |
| 2,718,033 | 9/1955 | Burke | 43/42.26 |
| 2,718,668 | 9/1955 | Burke | 18/59 |
| 3,367,060 | 2/1968 | Abercrombie | 43/42.33 |
| 3,389,490 | 6/1968 | Peters et al. | 43/42.1 |
| 3,879,883 | 4/1975 | Strader | 43/42.32 |
| 4,167,076 | 9/1979 | Weaver | 43/42.2 |
| 4,196,884 | 3/1980 | Zeman | 249/55 |
| 4,516,352 | 5/1985 | Firmin | 43/42.37 |

Primary Examiner—Nicholas P. Godici
Assistant Examiner—Mike Starkweather
Attorney, Agent, or Firm—Karen M. Gerken; Martin P. Hoffman; Mitchell B. Wasson

[57] ABSTRACT

An artificial crab lure in the configuration of a natural crab body being formed entirely as a unitary member of a soft resilient molding. The crab body is defined by a center body portion, a pair of eyes, front claws and a plurality of legs. An integral shank portion projects outwardly from the center body and is adapted to have the straight portion of a hook passed therethrough. The claws, legs and shank are adapted for up and down, side to side, and rotational movements with respect to the center body portion such that the crab body, when placed in water, simulates the movement of a living crab. The molding may be colorized by dyes and pigments, and may have light-reflective particles randomly dispersed therethrough.

13 Claims, 1 Drawing Sheet

CRAB LURE

BACKGROUND OF THE INVENTION

1. Field of the Invention

The invention pertains generally to lures or artificial bait for effectively attracting and catching edible marine animals. More specifically, the invention relates to a lure particularly and uniquely designed and adapted to catch fish and crabs.

Because it is known that a variety of living fish and crabs feed upon living crabs, it is desirable that an artificial lure which employs an artificial crab as bait be configured to assume, as realistically as possible, the exact shape and characteristic details of a natural crab. The degree to which an artificial crab lure successfully authenticates the appearance of a natural crab is directly determinative of its ability to attract and catch live fish and crabs.

In addition to visually presenting the inherent structural peculiarities of a living crab, an effective crab lure will desirably simulate the behavior of a living crab in the water. It is thus advantageous that a crab lure be fabricated of such a material and in such a manner so as to enable it to operatively execute the unique, undulating motion, as well as the straight and sideward travelling movements, of a living crab, when the lure is acted upon by the water and by the fishing line to which it is attached.

A further significant feature which serves to enhance the effectiveness of a lure involves the color and luster of the lure. In the case of crab lures, it has been discovered that the degree to which crabs are attracted to the lure can be greatly increased by forming the body of the artificial crab from a colored translucent material having contrasting light-reflective particles randomly embedded therein. The latter combination of contrasting color, and light reflection, appeals to living crabs at their preferred water depths.

Thus, the need exists for a crab lure which is able to realistically adopt the structural form, operative behavior, and visual colorations, of a living crab, when introduced into the natural habitat of livin crabs and fish so as to attract crabs and fish in large numbers. Moreover, the need exists for a crab lure possessing such attributes and which is easy to utilize, is simple in construction, is conducive to conventional manufacturing techniques, and which is cost-effective.

The present invention achieves the foregoing attributes and objectives by providing a crab lure which possesses the structural details of a living crab. The crab lure is fabricated as a unitary member of polyvinylchloride or the like by injection molding techniques to yield a complete, unitary crab lure that is pliable and resilient. The crab lure body is molded integral with a shank for receiving a hook and, thus, is characterized by simplicity in construction and ease of utilization. The orientation of the shank with respect to the crab lure body, together with the characteristic resiliency of the lure, renders the present crab lure uniquely capable of simulating the action of a living crab when the lure is disposed in depths of water. Finally, the novel crab lure of the subject invention is color-pigmented, and is provided withcontrasting,randomlydispersed light reflective particles, which create an appearance in water that is particularly appealing to living crabs.

2. Description of the Prior Art

It is known in the prior art to provide a lure which is luminous, and which has the general configuration of a living crab. For instance, U.S. Pat. No. 2,303,097 to Townsend et al. discloses a crab form bait. The bait, however, is formed from numerous components, principally a head and legs section, an upper shell section and a lower shell section, which are assembled and secured together. Although the head and legs section is molded as one piece, it contains an embedded metal stiffening brace and a keyblock. Luminosity of the bait is achieved by incorporating into the molding material salts which glow after having been exposed to natural or artificial light.

The prior art further discloses the concept of applying light reflective particles to a fish lure. U.S. Pat. No. 3,367,060 to Abercrombie, for example, shows a fish lure body 10 which is decorated with glitter particles to simulate the scales of a fish. The body of the lure is rigid, being formed of a heavy metal. The glitter particles are applied to the body by means of glue.

It is also generally known in the prior art to fabricate a fish lure from a polyvinyl resin. The latter teaching is illustrated in U.S. Pat. No. 2,718,668 to Burke, wherein a fish lure is formed by molding a synthetic resin. The lure is formed by depositing numerous layers of colored material into the mold.

Similarly, U.S. Pat. No. 3,389,490 to Peters et al. shows a lure having a body preferably fabricated of resilient thermoplastic material; U.S. Pat. No. 4,196,884 to Zeman discloses a molded elastomeric lure, and U.S. Pat. No. 4,167,076 to Weaver teaches a molded synthetic plastic worm.

The prior art fails to teach or suggest the novel combination of a crab lure having the structural configuration of a crab and being formed as a unitary member with an integral hook shank of a pliant polyvinylchloride pigmented material containingtherein randomly dispersed light reflective particles.

SUMMARY OF THE INVENTION

The invention pertains to an artificial lure for attracting and catching fish, crabs and the like. The lure assumes the realistic configuration of a living crab, being defined by a center body portion and a plurality of outer extremities including a pair of front claws and a plurality of legs. The center body portion is provided with a pair of integral eyes, as well as an integral shank which projects outwardly from either side of or the rear of the center body portion. The shank presents a means by which a hook member may be associated with the lure. In particular, a hook member is adapted to be forced into and through the shank such that the curved barbed end of the hook is held proximate the point of intersection between the shank and the center body portion, with the straight portion of the hook being embedded within and extending through the shank. The opposite end of the hook is intended to have a line or jig attached thereto at the opposite free end of the shank.

The entire crab lure, including the center body portion, the outer extremities and the shank, is injection molded in one piece of polyvinylchloride. The center body portion of the lure is rather dense, whereas the outer extremities and shank are longer and more slender. The lure is pliable and resilient, with the outer extremities and the shank being capable of up and down, side to side, and rotational movements with respect to the center body portion. This freedom of movement allows the crab lure to simulate the undulating action of a living crab when the lure is placed in water. Additionally, with the shank projecting from the side of the center body portion and the lure being pulled to the side by the associated line, the lure realistically simulates the sideways walking movement of a natural crab. Similarly, with the shank projecting from the rear of the center body portion and the lure being pulled to the rear by the associated line, the lure realistically mimics the rearward straight travel movement of a natural crab.

The lure body is intended to be colorized by means of dyes and pigments added to the molding material. Both dyes and pigments may be combined with the molding material or added to the mold in order to obtain a variegated multicolored look. Additionally, it is preferred that light reflecting particles in a color that contrasts with the base color of the lure be randomly dispersed in the molding material.

DESCRIPTION OF THE PREFERRED EMBODIMENT

Figure 1:
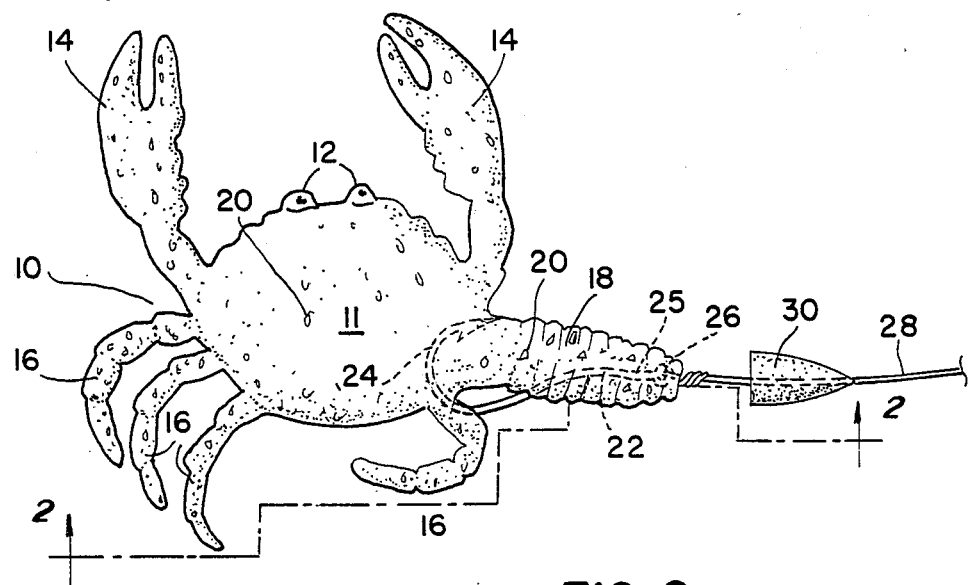
FIG. 1 is a top plan view of a preferred embodiment for the crab lure of the present invention.
Figure 2:
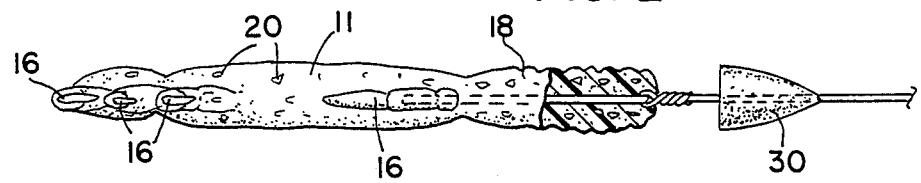
FIG. 2 is a side partial cross-sectional view of the crab lure taken along line 2—2 of FIG. 1.

A preferred embodiment for the crab lure of the instant invention is illustrated in FIGS. 1 and 2. As depicted in FIG. 1, the crab lure comprises a unitary crab-shaped and crab-detailed body 10. The body 10 includes a central body portion 11 having a pair of eyes 12, and a plurality of outer extremities associated with the central body and including a pair of front claws 14 and a plurality of legs 16. An integral cylindrical shank portion 18 projects outwardly from the side of the crab body, the body on the latter side being provided with a fewer number of legs than the number of legs provided on the opposite side of the body.

As can be seen in FIG. 1, the crab lure is very natural looking in its configuration and appearance. Indeed, the crab lure is assymmetrical in its arrangement of components and, as closely as possible, simulates the structural configuration of a natural living crab.

The crab lure is intended to be fabricated of a clear polyvinylchloride or the like, which is heated and injection molded to form the solid unitary body. Appropriate colored dyes and pigments are combined with the molding compound so that the crab lure body possesses a particular final color. Preferred final colors for the lure body are, for example, black, brown, gray and red. A clear, colorless transparent lure may be obtained without the addition of dyes and pigments to the molding compound. More than one different colored dye and pigment may be added to the molding compound to obtain a variegated, multi-colored appearance. Additionally, it is preferred that light reflective particles 20 of glitter or the like be randomly dispersed into the molding material whereby such particles are visible in the transparent molded lure. The attractive nature of the lure is enhanced when the particles 20 are of a contrasting color to the final color of the lure body. For example, blueparticles may be incorporated into a red lure, red particles into a blue lure, black particles into a brown lure, blue particles into a gray lure, and red, blue and silver particles into a clear lure.

A significant feature of the molded crab lure is its resiliency. The lure is very pliable, particularly at the outer extremities and in the shank. For instance, the lure will assume a generally flat position when resting upon a support surface but, when lifted above the support surface by the center body portion, is characterized by having its legs, claws and shank deflected downwardly. Indeed, the outer extremities and the shank are capable of up and down, side to side, and rotational movements, with respect to the center body portion. The latter characteristic results from the fact that that outer extremities of the lure are long and slender compared to the denser, thicker central portion of the lure, and thus enable the lure to perform a natural-looking undulating action in the water which simulates the movements of a living crab. As most clearly illustrated in FIGS. 1 and 2, the shank portion 18 presents a means by which a hook 22 is intended to be associated with the lure in a concealed manner. The curved portion 24 of the hook may be forced into the body of the lure, as shown in FIG. 1, proximate the point of intersection between the shank and the lure body. The straight portion 25 of the hook, which terminates in an eyelet 26, is intended to be passed through the shank. A line 28, upon which is rotatably mounted a jig 30, is tied to the eyelet 26 to complete the assembly. The hook is easily inserted into the body and shank portions of the crab lure because the molded lure is soft and easily penetrated and, as previously discussed herein, is very compliant. The resiliency of the lure body and its shank portion allows it to be manually manipulated and deformed around the hook.

The hook and line attachment shown in FIGS. 1 and 2, being located as it is on the side-mounted shank 18, causes the crab lure to execute the characteristic sideways movement of a living crab when it is pulled in a sideward direction by the line 28. The present invention is therefore uniquely adapted to perform the sideways walking movements of a natural crab in water, as well as to mimic the undulating action of a living crab's legs and claws.

Figure 3:
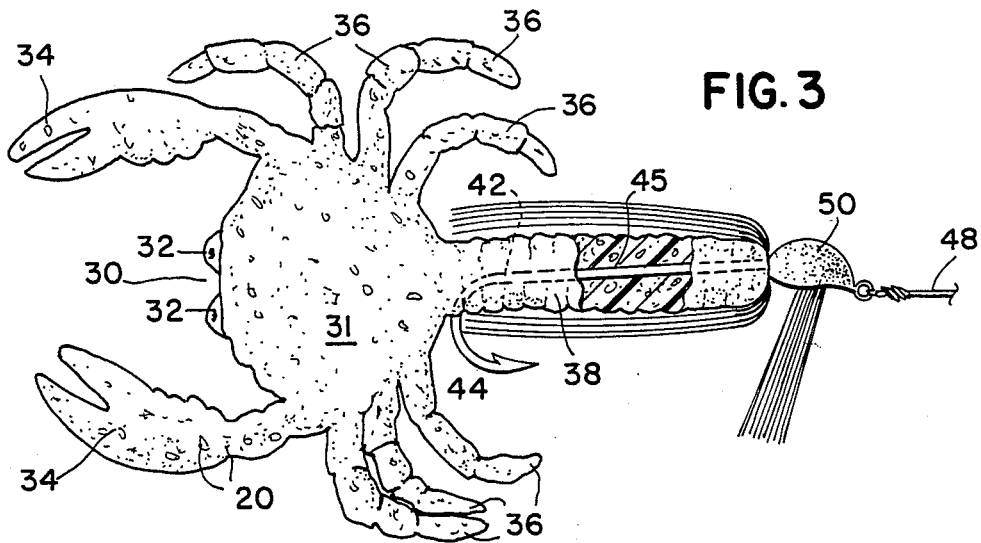
FIG. 3 is a top plan view of a first alternative embodiment for the crab lure of the present invention.

A first alternative embodiment for the crab lure is particularly illustrated in FIG. 3. As shown therein, the crab lure comprises a unitary body 30 having a central body section 31 with which is associated a pair of eyes 32, and a plurality of outer extremities including a pair of front claws 34 and a plurality of legs 36. An integral cylindrical shank portion 38 projects outwardly from the rear of the central body, generally opposite eyes 32.

The crab lure of FIG. 3 possesses the same features and characteristics of the crab lure which were discussed in connection with FIGS. 1 and 2, namely, its natural looking structural configuration, its material of manufacture, its coloration and its resiliency. The distinction associated with the first alternative embodiment of FIG. 3 resides in the location of the shank 38 at the rear of the lure body.

The crab lure of FIG. 3 is adapted to have a hook 42, which is attached to jig 50, inserted through the shank 38. The curved portion 44 of the hook projects through the shank proximate the point of intersection between the shank and the central body, with the straight portion 45 of the hook extending through the shank 38. The opposite end of the hook terminates in jig 50, to which is secured to a line 48. The crab lure of FIG. 3 is thus mounted in the manner of a jig trailer and, consequently, simulates the straight rearward travel of a living crab when the crab lure is utilized in water and pulled rearward by means of line 48.

Although the present invention has been described in detail in connection with a preferred and alternative embodiments, it should be understood that various modifications may be made to the specified features, characteristics and components of the invention by one skilled in the art without departing from the spirit and scope of the invention as defined by the appended claims.

What is claimed is:

1. An artificial crab lure for use with a hook, said crab lure comprising a unitary and integral crab body defined by a center body portion, a plurality of outer extremities including legs, and a shank projecting outwardly from the center body portion, said crab body being formed entirely of a solid molding of a soft resilient material, said crab body being characterized in that said outer extremities and said shank are capable of up and down, side to side, and rotational movements with respect to said center body portion, said shak being cylindrical in shape and having a thickness which is greater than the thickness of said legs, whereby said shank is adapted to have a hook passed longitudinally within said shank, such that a substantial portion of said hook is embedded in said shank for securing said crab body with respect to a fishing line, said crab body simulating the movement of a living crab when pulled in water by means of said line.

2. The crab lure recited in claim 1 wherein said shank projects from a side of said center body portion such that, when said crab body is pulled sideways in water by means of said fishing line, said crab body simulates the movement of a living crab.

3. The crab lure recited in claim 1 wherein said shank projects from the rear of said center body portion such that, when said crab body is pulled rearward in water by means of said fishing line, said crab body simulates the rearward movement of a living crab.

4. The crab lure recited in claim 1 wherein said center body portion is provided with a pair of integral eyes.

5. The crab lure recited in claim 1 wherein said molding contains at least one colored dye.

6. The crab lure recited in claim 1 wherein said molding contains randomly dispersed light-reflective particles.

7. The crab lure recited in claim 5 wherein said molding contains at least one pigment to give said crab body a multi-colored appearance.

8. The crab lure recited in claim 5 wherein said molding contains randomly dispersed light-reflective particles.

9. The crab lure recited in claim 1, wherein the curved portion of said hook is intended to be secured in said center body portion proximate the point of intersection between said shank and said center body portion and said straight portion of said hook is intended to extend through said shank.

10. The crab lure recited in claim 1 wherein said particles are glitter.

11. An artificial crab lure for use with a hook, said crab lure comprising a unitary and integral crab body portion, said body poriton having a front portion, a rear portion and a pair of opposite side portions, a plurality of outer extremities projecting outwardly from each of said side portions, a shank projecting outwardly from one of said side portions, said body portion, said extremities and said shank being formed entirely as a solid molding of soft resilient material, said extremities and said shank being capable of up and down, side to side and rotational movements with respect to said body portion, said shank being cylindrical in shape and having a thickness which is greater than the thickness of said extremities whereby a hook may be passed longitudinally within said shank and into said body portion such that, when said crab lure is pulled in water by means of a fishing line attached to said hook, said crab lure simulates the sideward movement of a living crab.

12. An artificial crab lure for use with a jig hook attached to a lead sinker and having a surrounding skirt, said crab lure comprising a unitary and integral crab body portion, said body poriton having a front portion, a rear portion and a pair of opposite side portions, a plurality of outer extremities projecting outwardly from each of said side portions, a shank projecting outwardly from said rear portion, said body portion, said extremities and said shank being formed entirely as a solid molding of soft resilient material, said extremities and said shank being capable of up and down, side to side and rotational movements with respect to said body portion, said shank being cylindrical in shape and having a thickness which is greater than the thickness of said extremities whereby a jig hook may be passed longitudinally within said shank, with the attached skirt substantially covering said shank, such that when said jig falls to the bottom of the water said crab lure floats upward, and when said jig is moved slightly said crab lure flutters in simulation of the movements of a living crab.

13. An artificial crab lure comprising a unitary and integral crab body defined by a center body portion, a plurality of outer extremities, and a shank projecting outwardly from the center body portion, said shank being cylindrical in shape and having a thickness which is greater than the thickness of said extemities, said crab body being formed entirely of a solid molding of a soft resilient material, said crab body being characterized in that said outer extremities and said shank are capable of up and down, side to side, and rotational movements with respect to said center body portion, said lure further including a fish hook, said shank having a substantial portion of said hook embedded therein for securing said crab body with respect to a fishing line.

* * * * *